(12) United States Patent
Wang et al.

(10) Patent No.: US 10,416,545 B2
(45) Date of Patent: Sep. 17, 2019

(54) LASER PROJECTOR

(71) Applicant: QISDA CORPORATION, Taoyuan (TW)

(72) Inventors: Kai-Jing Wang, Tainan (TW); Huan-Yu Lin, Taoyuan (TW); Chun-Hao Hu, Tainan (TW)

(*) Notice: Subject to any disclaimer, the term of this patent is extended or adjusted under 35 U.S.C. 154(b) by 0 days.

(21) Appl. No.: 15/868,988

(22) Filed: Jan. 11, 2018

(65) Prior Publication Data

US 2018/0203337 A1  Jul. 19, 2018

(30) Foreign Application Priority Data

Jan. 13, 2017 (CN) .......................... 2017 1 0026333

(51) Int. Cl.
| | | |
|---|---|---|
| G03B 21/20 | (2006.01) | |
| G02B 27/28 | (2006.01) | |
| F21V 8/00 | (2006.01) | |
| G02B 26/00 | (2006.01) | |
| G03B 33/08 | (2006.01) | |

(52) U.S. Cl.
CPC ......... *G03B 21/204* (2013.01); *G02B 6/0008* (2013.01); *G02B 26/008* (2013.01); *G02B 27/283* (2013.01); *G03B 21/208* (2013.01); *G03B 21/2013* (2013.01); *G03B 21/2066* (2013.01); *G03B 21/2073* (2013.01); *G03B 33/08* (2013.01)

(58) Field of Classification Search
CPC .. G03B 21/204; G03B 33/08; G03B 21/2066; G03B 21/2073; G03B 21/208; G03B 21/2013; G02B 26/008; G02B 6/0008; G02B 27/283
See application file for complete search history.

(56) References Cited

U.S. PATENT DOCUMENTS

2013/0169894 A1* 7/2013 Ouderkirk .......... G02B 27/1033
349/9
2017/0227192 A1* 8/2017 Ikeda ...................... F21V 29/89

FOREIGN PATENT DOCUMENTS

| CN | 102906624 A | 1/2013 |
|---|---|---|
| TW | 201525602 A | 7/2015 |
| TW | 201614333 A | 4/2016 |

* cited by examiner

*Primary Examiner* — Sonji N Johnson (57) ABSTRACT

A laser projector includes a light-mixing module and a light-splitting module. The light-mixing module provides a laser beam which includes first polarized light and second polarized light. The light-splitting module includes a dichroic mirror, a half-wave plate, a phosphor wheel module, and a light-guiding rod. The dichroic mirror allows the first polarized light to pass and reflects the second polarized light. The half-wave plate receives the first polarized light which passes the dichroic mirror and converts the first polarized light into third polarized light. The phosphor wheel module receives the second polarized light reflected by the dichroic mirror, and provides a stimulated light which passes the dichroic mirror. The light-guiding rod receives the stimulated light and the third polarized light, thereby providing an illumination beam.

10 Claims, 7 Drawing Sheets

LASER PROJECTOR

CROSS REFERENCE TO RELATED APPLICATION

This application claims the benefit of Chinese application No. 201710026333.5 dated 2017 Jan. 13.

BACKGROUND OF THE INVENTION

1. Field of the Invention

The present invention is related to a laser projector, and more particularly, to a laser projector with reduced optical components, simple phosphor wheel design, and improved heat dissipation.

2. Description of the Prior Art

Figure 1:
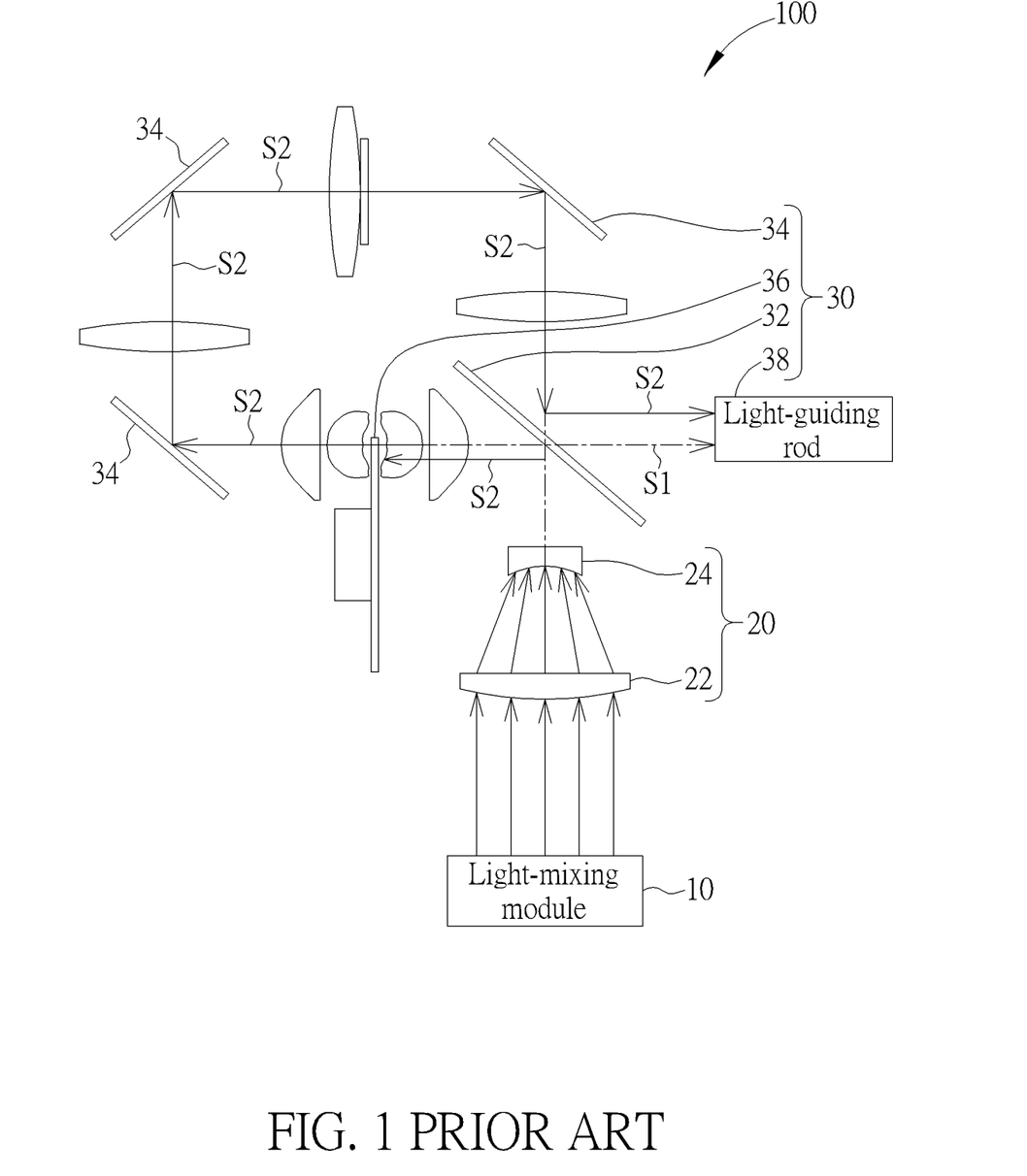
FIG. 1 is a diagram illustrating a prior art laser projector.

Laser projecting technology is advantageous in providing high-quality, large-screen and high-resolution images using self-focusing and wavelength-selective laser sources of high spectral brightness. FIG. 1 is a diagram illustrating a prior art laser projector 100. The laser projector 100 includes a light-mixing module 10, a light-guiding module 20, and a light-splitting module 30. The light-mixing module 10 includes a plurality of laser sources for providing laser beams. The light-guiding module 20 includes a convex lens 22 and a concave lens 24 as condensers for adjusting the size of the laser beams. The light-splitting module 30 includes a dichroic mirror 32, a plurality of reflectors 34, a phosphor wheel 36, and a light-guiding rod 38.

Figure 2:
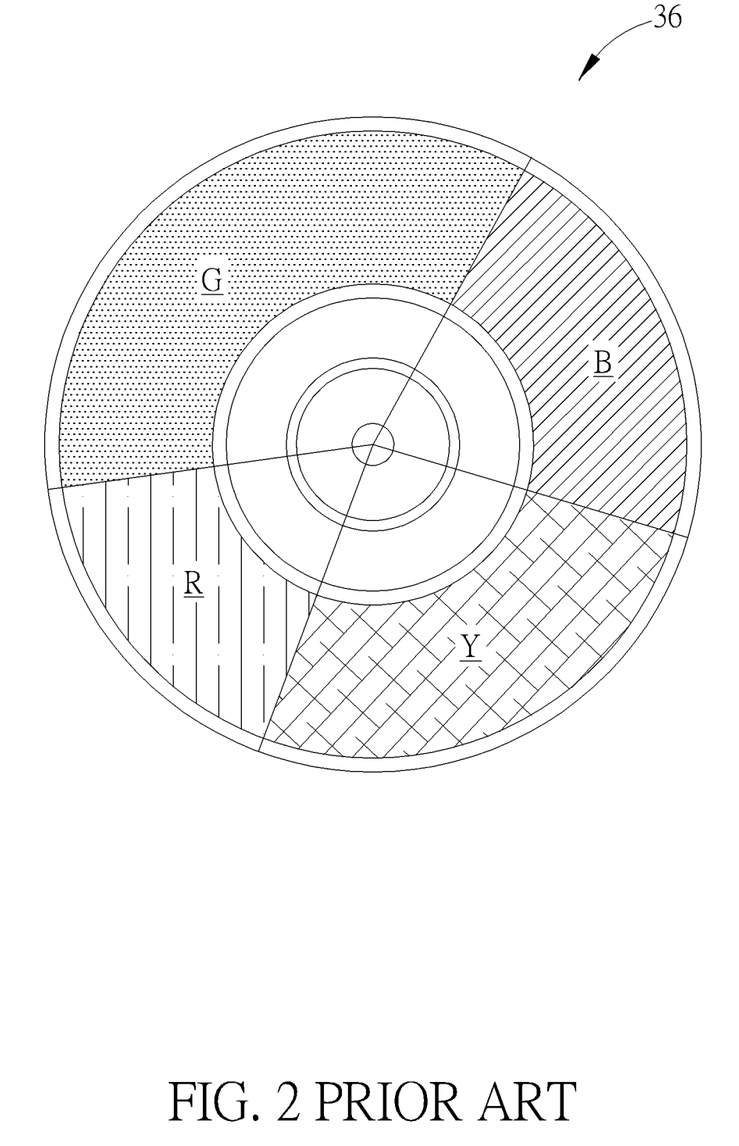
FIG. 2 is a diagram illustrating a phosphor wheel of the prior art laser projector.

FIG. 2 is a diagram illustrating the phosphor wheel 36 of the prior art laser projector 100. The phosphor wheel 36 includes a red block R, a green block G, a blue block B, and a yellow block Y. The red block R, the green block G and the yellow block Y are coated with red phosphor compound, green phosphor compound and yellow phosphor compound, respectively. The blue block B is a pervious region on the phosphor wheel 36. The phosphor wheel 36, driven by a motor, is configured to spin during operation so as to project laser beams on different blocks of the phosphor wheel 36 at different time, thereby providing light in various colors.

In the prior art laser projector 100, the dichroic mirror 32 is designed to reflect blue laser beams and pass light in other colors. In other words, when the laser beams are incident on the light-splitting module 30, the dichroic mirror 32 is configured to reflect blue laser beams to the phosphor wheel 36. When the blue laser beams impact the red block R, the green block G and the yellow block Y, red light, green light and yellow light (represented by an arrow S1 in FIG. 2) may be respectively stimulated and reflected back to the dichroic mirror 32. Under such circumstance, the dichroic mirror 32 is configured to allow the red light, the green light and the yellow light to pass and arrive at the light-guiding rod 38. On the other hand, the blue laser beams incident on the blue block B may pass the pervious region of the phosphor wheel 36 and be sequentially reflected by three reflectors 34 before being re-directed to the dichroic mirror 32. Under such circumstance, the dichroic mirror 32 is configured to reflect the blue laser beams (represented by an arrow S2 in FIG. 2) and directed the blue laser beams to the light-guiding rod 38. The light-guiding rod 38 is configured to homogenize and project light of various colors onto an image modulation device (not shown) so that the laser projector 100 may produce corresponding images.

The prior art laser projector 100 uses laser phosphor display technology in which light generated by an array of blue laser diodes are projected onto a spinning multi-color phosphor wheel 36 to illuminate light in various colors. Since the prior art laser projector 100 adopts a blue light relay structure, the light-splitting module 30 needs to includes many reflectors 34. Also, multiple color blocks and a pervious region needs to be arranged on the phosphor wheel 36, which complicates the manufacturing process and increase the noise level of the laser projector 100 during operation.

SUMMARY OF THE INVENTION

The present invention provides a laser projector which includes a light-mixing module, a light-splitting module, and a color wheel. The light-mixing module is configured to provide a first laser beam which includes a first polarized light and a second polarized light, wherein a polarization of the first polarized light is different from a polarization of the second polarized light. The light-splitting module is configured to receive the first laser beam and includes a dichroic mirror, a half-wave plate, a phosphor wheel module, and a light-guiding rod. The dichroic mirror is configured to pass the first polarized light and reflect the second polarized light. The half-wave plate is configured to receive the first polarized light after the first polarized light passes through the dichroic mirror and convert the first polarized light into third polarized light, wherein a polarization of the third polarized light is the same as the polarization of the second polarized light. The phosphor wheel module is configured to receive the second polarized light after the second polarized light is reflected by the dichroic mirror and provide a first stimulated light which passes through the first dichroic mirror. The light-guiding rod is configured to receive the first stimulated light and the third polarized light, thereby providing an illumination beam. The color wheel is configured to filter the illumination beam and provide light in a plurality of color beams.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
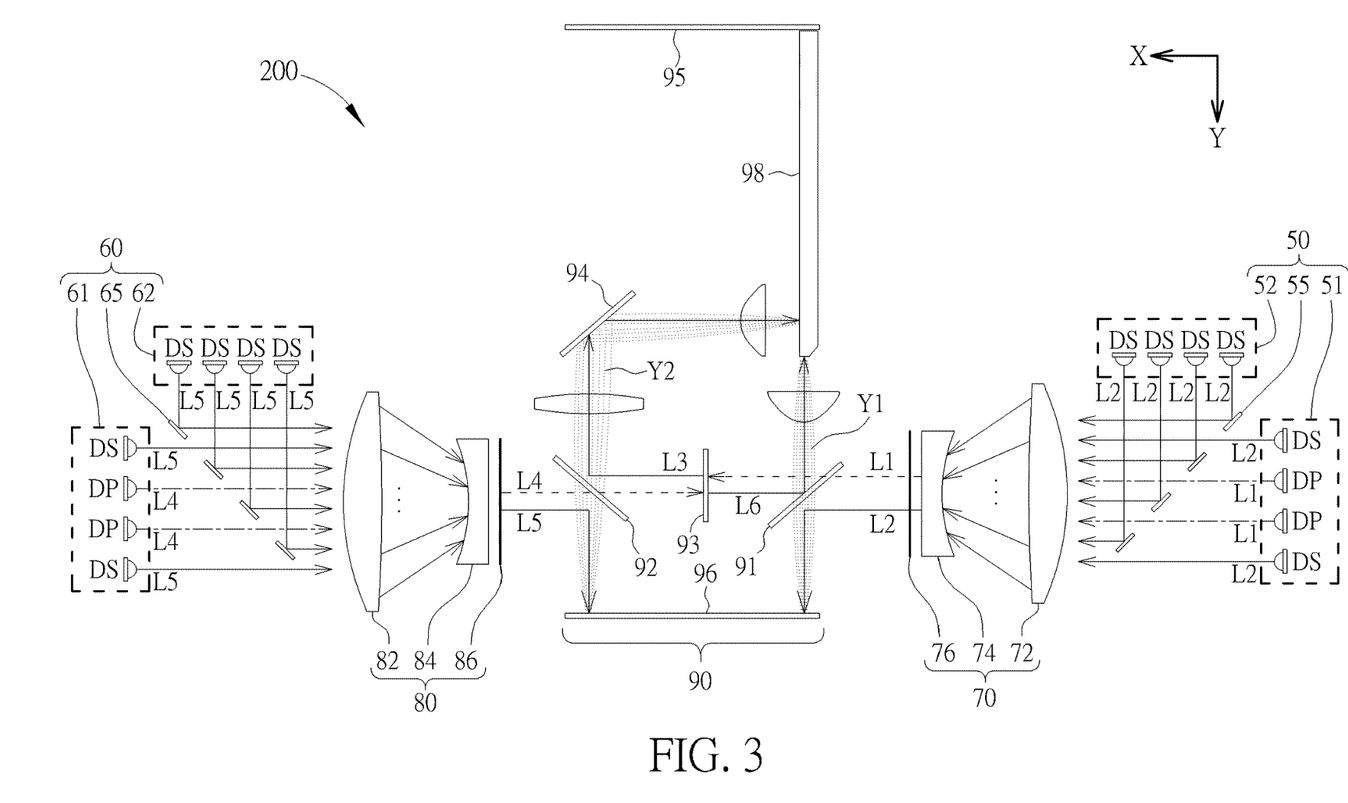
FIG. 3 is a diagram illustrating a laser projector according to an embodiment of the present invention.

FIG. 3 is a diagram illustrating a laser projector 200 according to an embodiment of the present invention. The laser projector 200 includes a first light-mixing module 50, a second light-mixing module 60, a first light-guiding module 70, a second light-guiding module 80, a light-splitting module 90, and a color wheel 95.

The first light-mixing module 50 is configured to provide a first laser beam, and the second light-mixing module 60 is configured to provide a second laser beam. The first laser beam provided by the first light-mixing module 50 includes P-polarized blue light L1 and S-polarized blue light L2. The second laser beam provided by the second light-mixing module 60 includes P-polarized blue light L4 and S-polarized blue light L5.

In the laser projector 200 of the present invention, the first light-mixing module 50 and the second light-mixing module 60 each includes two laser modules and one or multiple reflectors. In an embodiment, the laser module 51 of the first light-mixing module 50 includes P-polarized blue laser diodes DP amounting A1 and S-polarized blue laser diodes DS amounting B1 for emitting P-polarized blue light L1 and S-polarized blue light L2 which propagates along a first path (the X-axis in FIG. 3); the laser module 52 of the first light-mixing module 50 includes S-polarized blue laser diodes DS amounting C1 for emitting S-polarized blue light L2 which propagates along a second path (the Y-axis in FIG. 3), wherein the first path is perpendicular to the second axis; the laser module 61 of the second light-mixing module 60 includes P-polarized blue laser diodes amounting A2 and S-polarized blue laser diodes amounting B2 for emitting P-polarized blue light L4 and S-polarized blue light L5 which propagates along the first path; the laser module 62 of the second light-mixing module 60 includes S-polarized blue laser diodes amounting C2 for emitting S-polarized blue light L5 which propagates along the second path. According to various applications, A1, B1, C1, A2, B2 and C2 may be zero or any positive integer. For illustrative purpose, FIG. 3 depicts an embodiment when A1=B1=A2=B2=2 and C1=C2=4. In another embodiment, the laser module 51 of the first light-mixing module 50 may only include one or multiple P-polarized blue laser diodes (namely, B1=0) and the laser module 61 of the second light-mixing module 60 may only include one or multiple P-polarized blue laser diodes (namely, B2=0). However, the amount and polarization type of the blue laser diodes in the first light-mixing module 50 and the second light-mixing module 60 do not limit the scope of the present invention.

In the first light-mixing module 50, the surface of each reflector 55 is disposed at a predetermined angle (such as 45 degrees) with respect to the first path, in an in-line arrangement with respect to the one or multiple blue laser diodes in the laser module 52, and in a staggered arrangement with respect to the one or multiple blue laser diodes in the laser module 51. Therefore, the S-polarized blue light L2 originally propagating along the second path may be reflected by the reflectors 55 to propagate along the first path, while the P-polarized blue light L1 may continue to propagate along the first path. Similarly, in the second light-mixing module 60, the surface of each reflector 65 is disposed at a predetermined angle (such as 45 degrees) with respect to the first path, in an in-line arrangement with respect to the one or multiple blue laser diodes in the laser module 62, and in a staggered arrangement with respect to the one or multiple blue laser diodes in the laser module 61. Therefore, the S-polarized blue light L5 originally propagating along the second path may be reflected by the reflectors 65 to propagate along the first path, while the P-polarized blue light L4 may continue to propagate along the first path.

The first light-guiding module 70 includes a convex lens 72, a concave lens 74, and a diffuser 76, wherein the convex lens 72 and the concave lens 74 are condensers for adjusting the size of the first laser beam, and the diffuser 76 can convert the first laser beam into an uniform planar beam. The second light-guiding module 80 includes a convex lens 82, a concave lens 84, and a diffuser 86, wherein the convex lens 82 and the concave lens 84 are condensers for adjusting the size of the second laser beam, and the diffuser 86 can convert the second laser beam into an uniform planar beam. However, the structures of the first light-guiding module 70 and the second light-guiding module 80 do not limit the scope of the present invention.

The light-splitting module 90 includes a first dichroic mirror 91, a second dichroic mirror 92, a half-wave plate 93, a reflecting mirror 94, a phosphor wheel module 96, and a light-guiding rod 98. The first dichroic mirror 91 and the second dichroic mirror 92 are configured to reflect S-polarized blue light in the incident laser beam and pass P-polarized blue light and other color light in the incident laser beam. Different from the conventional phosphor wheel 36, the phosphor wheel module 96 includes a reflection disc (not shown) coated with phosphor compound and excludes the pervious region.

Figure 4A:
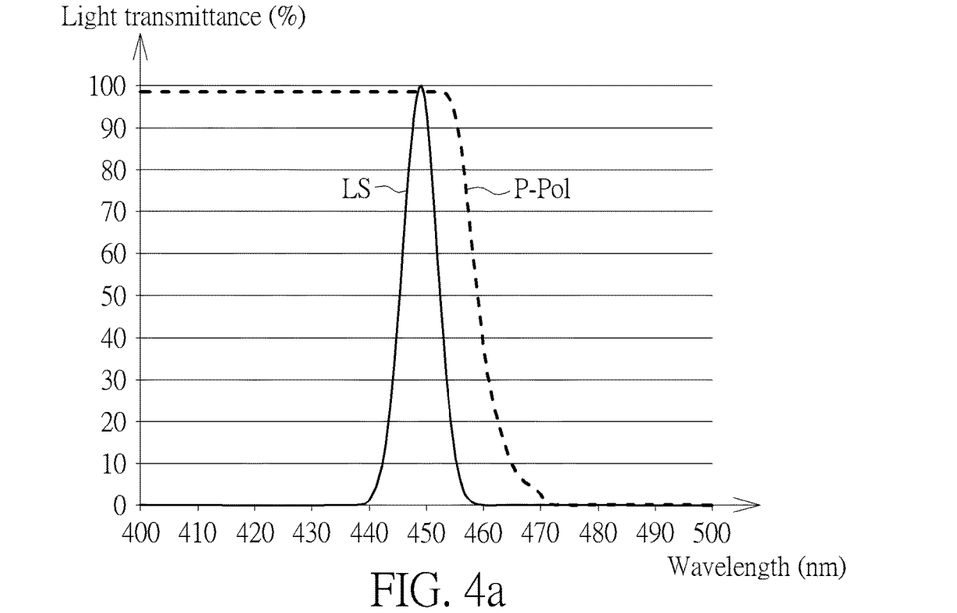
FIG. 4a and FIG. 4b are diagrams illustrating the spectrum of a dichroic mirror in the present invention.
Figure 4B:
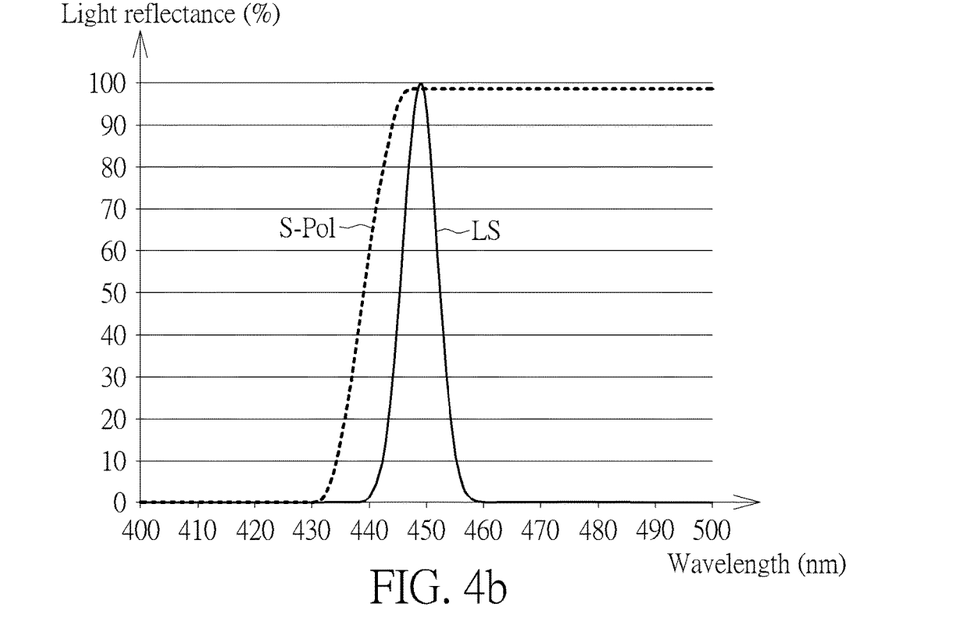

FIG. 4a and FIG. 4b are diagrams illustrating the spectrum of the dichroic mirror in the present invention. The horizontal axis represents wavelength (nm) and LS represents the blue laser spectrum. In FIG. 4a, the vertical axis represents spectral transmittance (%) and P-Pol represents P-polarized light. In FIG. 4b, the vertical axis represents spectral reflectance (%) and S-Pol represents S-polarized light. As depicted in FIG. 4a, the spectral transmittance of the P-polarized light P-POL is larger than 95% (after integral conversion) within the blue light wavelength range. As depicted in FIG. 4b, the spectral reflectance of the S-polarized light S-POL is larger than 95% (after integral conversion) within the blue light wavelength range. More specifically, when the first laser beam provided by the first light-mixing module 50 is incident on the light-splitting module 90, the first dichroic mirror 91 is configured to allow the P-polarized blue light L1 to pass and arrive at the half-wave plate 93, but configured to reflect the S-polarized blue light L2 to the phosphor wheel module 96. After receiving the S-polarized blue light L2 reflected by the first dichroic mirror 91, the phosphor wheel module 96 is configured to provide a first stimulated light Y1 (such as yellow light). On the other hand, the half-wave plate 93 is configured to receive the P-polarized blue light L1 after it passes through the first dichroic mirror 91 and convert the P-polarized blue light L1 into S-polarized blue light L3. Therefore, the first stimulated light Y1 may pass through the first dichroic mirror 91 and arrive at the light-guiding rod 98, and the S-polarized blue light L3 may be redirected to the light-guiding rod 98 by the second dichroic mirror 92 and the reflecting mirror 94.

Similarly, when the second laser beam provided by the second light-mixing module 60 is incident on the light-splitting module 90, the second dichroic mirror 92 is configured to allow the P-polarized blue light L4 to pass and arrive at the half-wave plate 93, but configured to reflect the S-polarized blue light L5 to the phosphor wheel module 96. After receiving the S-polarized blue light L5 reflected by the second dichroic mirror 92, the phosphor wheel module 96 is configured to provide a second stimulated light Y1 (such as yellow light). On the other hand, the half-wave plate 93 is configured to receive the P-polarized blue light L4 after it passes through the second dichroic mirror 92 and convert the P-polarized blue light L4 into S-polarized blue light L6. Therefore, the second stimulated light Y2 may pass through the second dichroic mirror 92 and reflected to the light-guiding rod 98 by the reflecting mirror 94, and the S-polarized blue light L6 may be reflected by the first dichroic mirror 91 to arrive at the light-guiding rod 98.

Figure 5:
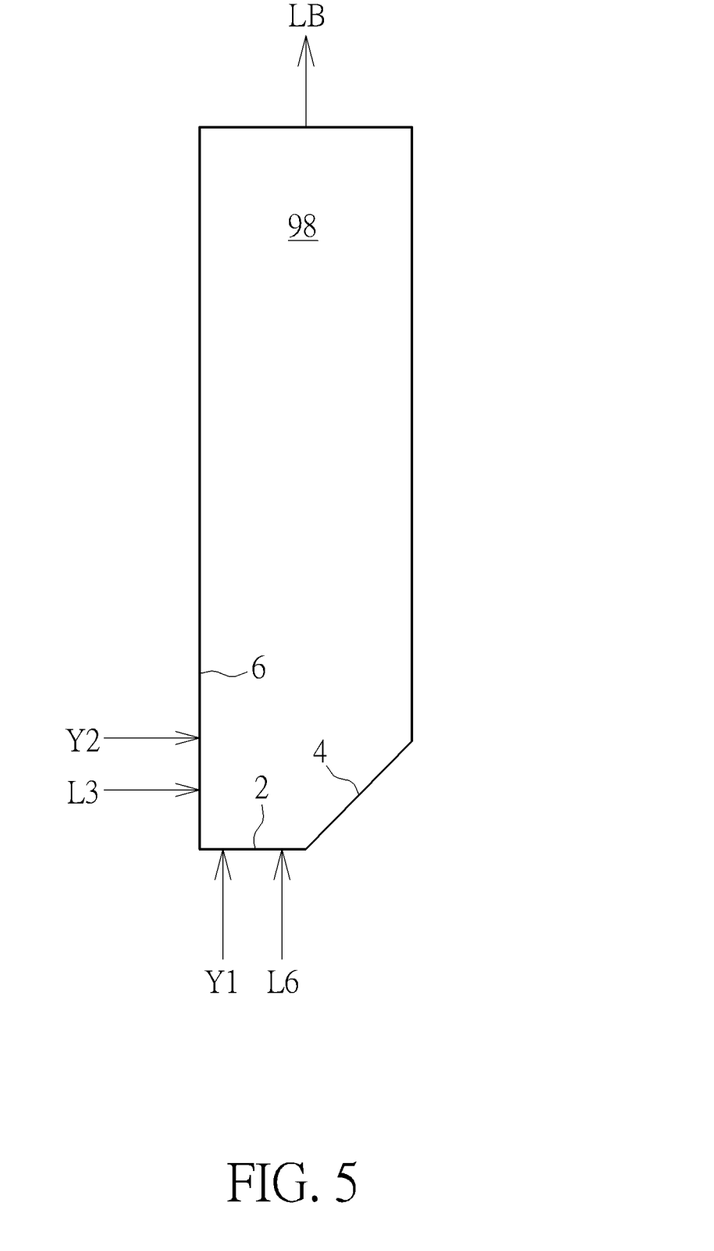
FIG. 5 is a diagram illustrating an enlarged view of a light-guiding rod according to an embodiment of the present invention.

FIG. 5 is a diagram illustrating an enlarged view of the light-guiding rod 98 according to an embodiment of the present invention. The light-guiding rod 98 includes a first incident surface 2, a relay surface 4, and a second incident surface 6. The first incident surface 2 corresponds to the phosphor wheel module 90 for receiving the first stimulated light Y1 and the S-polarized blue light L6. The relay surface 4 is disposed at an angle of 45 degrees with respect to the first incident surface 2. The second incident surface corresponds to the relay surface 4 for receiving the second stimulated light Y2 and the S-polarized blue light L3. The relay surface 4 may reflect the incident second stimulated light Y2 and the S-polarized blue light L3 to the same direction where the first stimulated light Y1 and the S-polarized blue light L6 propagate. After receiving the first stimulated light Y1, the second stimulated light Y2, the S-polarized blue light L3, or the S-polarized blue light L6, the light-guiding rod 98 is configured to provide a lighting beam LB to the color wheel 95. After filtering the lighting beam LB, the color wheel 95 is configured to provide light in a plurality of color beams for the laser projector 200. Various images may be projected using color beams by an image modulation device (not shown) and a lens (not shown) of the laser projector 200.

Figure 6:
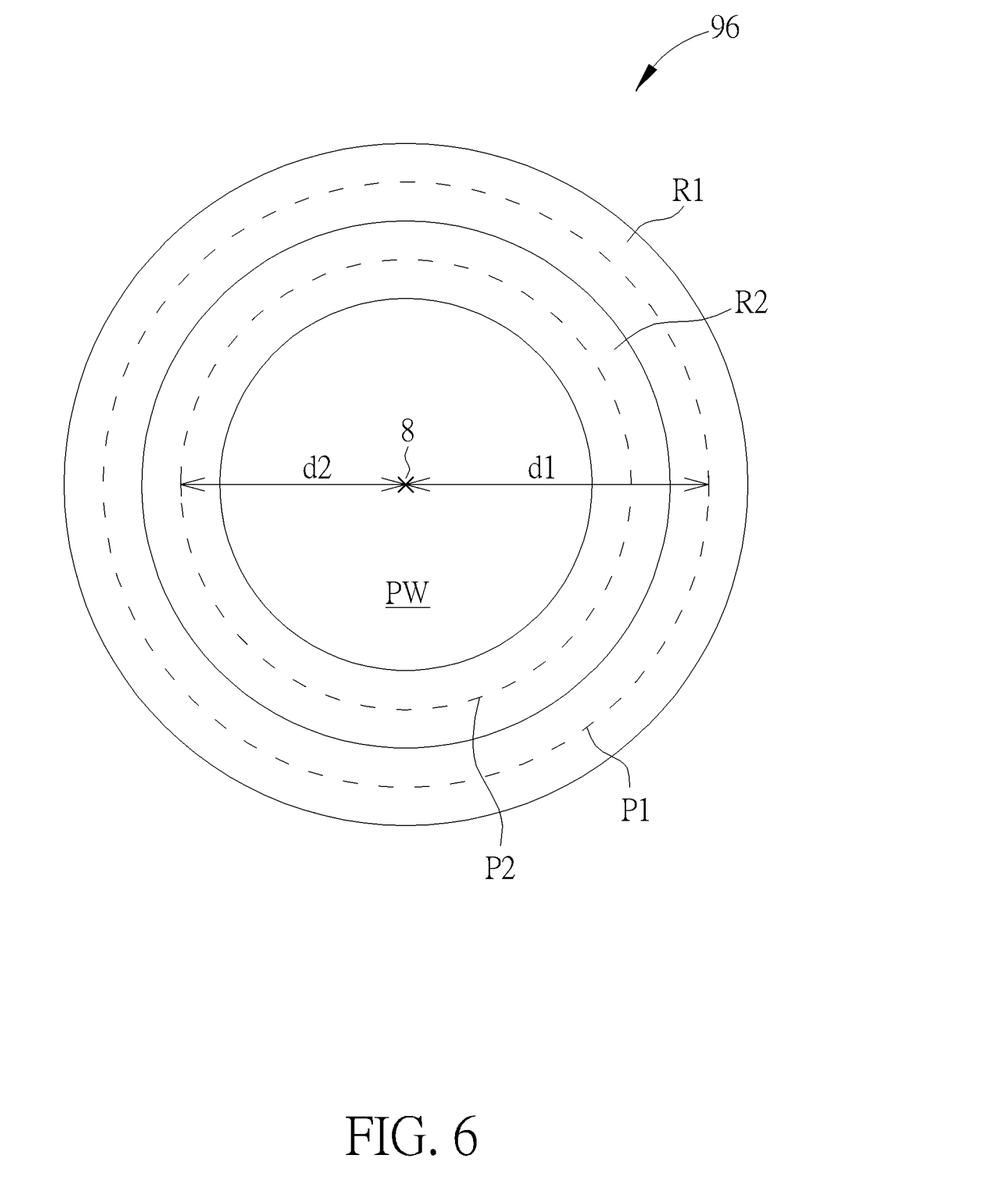
FIG. 6 is a diagram illustrating a phosphor wheel module according to an embodiment of the present invention.

FIG. 6 is a diagram illustrating the phosphor wheel module 96 according to an embodiment of the present invention. In this embodiment, the phosphor wheel module 96 includes a phosphor wheel PW which includes a center 8, a first part R1 and a second part R2. The phosphor wheel module 96, driven by a motor (not shown), is configured to spin during operation. The phosphor wheel PW is coated with phosphor compound associated with a specific color light, such as one which produces yellow light when stimulated by incident light. The S-polarized blue light L2 provided by the first light-mixing module 50 is incident on the first part R1 of the phosphor wheel PW with a circular stimulation path represented by P1. The S-polarized blue light L5 provided by the second light-mixing module 60 is incident on the second part R2 of the phosphor wheel PW with a circular stimulation path represented by P2. As can be seen in FIG. 5, a first distance d1 between the circular stimulation path P1 and the center is different from a second distance d2 between the circular stimulation path P2 and the center 8, thereby improving thermal quenching and heat dissipation of the phosphor wheel module 96.

In another embodiment, the S-polarized blue light L2 provided by the first light-mixing module 50 may be incident on a first location of the phosphor wheel PW and the S-polarized blue light L5 provided by the second light-mixing module 60 may be incident on a second location of the phosphor wheel PW, wherein the distance between the first location and the center 8 is equal to the distance between the second location and the center 8. For example, both the S-polarized blue light L2 provided by the first light-mixing module 50 and the S-polarized blue light L5 provided by the second light-mixing module 60 may be incident on the first part R1 or second part R2 of the phosphor wheel PW.

Figure 7:
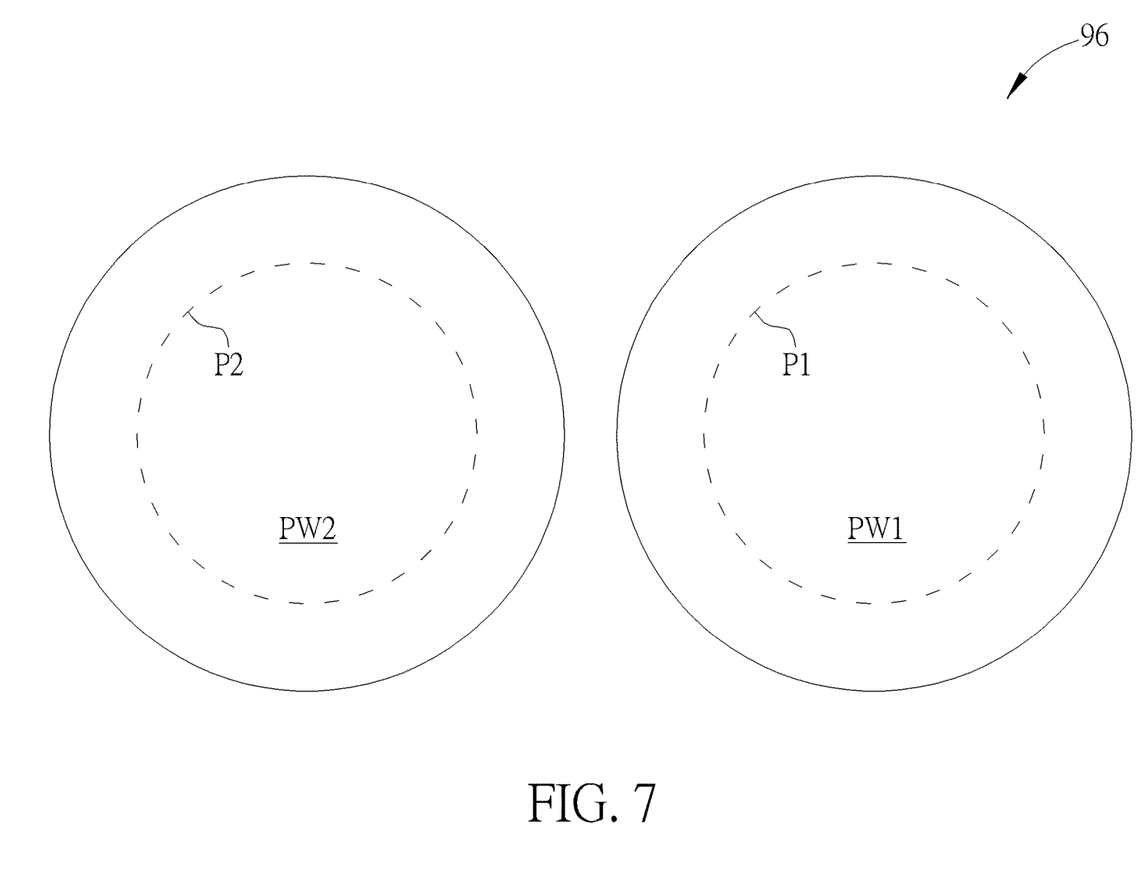
FIG. 7 is a diagram illustrating a phosphor wheel module according to another embodiment of the present invention.

FIG. 7 is a diagram illustrating the phosphor wheel module 96 according to another embodiment of the present invention. In this embodiment, the phosphor wheel module 96 includes a first phosphor wheel PW1 and a second phosphor wheel PW2. The first phosphor wheel PW1 and the second phosphor wheel PW2, driven by the same motor or by respective motors, are configured to spin during operation. The phosphor wheel PW1 and the second phosphor wheel PW2 are coated with phosphor compound associated with a specific color light, such as one which produces yellow light when stimulated by incident light. The S-polarized blue light L2 provided by the first light-mixing module 50 is incident on the first phosphor wheel PW1 with a circular stimulation path represented by P1. The S-polarized blue light L5 provided by the second light-mixing module 60 is incident on the second phosphor wheel PW2 with a circular stimulation path represented by P2. As can be seen in FIG. 6, the phosphor wheel module 96 includes two phosphor wheels, thereby improving thermal quenching and heat dissipation of the phosphor wheel module 96.

In the present invention, the laser projector 200 uses laser phosphor display technology in which light generated by an array of blue laser diodes are projected onto a spinning single-color phosphor wheel module. Since the present laser projector 200 provides two blue light transmission paths using two dichroic mirrors and a half-wave plate, the number of the reflectors can be reduced and thermal quenching can be avoided. Also, the monochromatic block arranged on the phosphor wheel simplifies the manufacturing process. Therefore, the present invention can provide a laser projector with reduced optical components, simple phosphor wheel design, reduced noise level, and improved heat dissipation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A laser projector comprising:
a first light-mixing module comprising at least one laser source and at least one reflector, and configured to provide a first laser beam which includes a first polarized light and a second polarized light, wherein a polarization of the first polarized light is different from a polarization of the second polarized light;
a light-splitting module configured to receive the first laser beam and comprising:
a first dichroic mirror configured to pass the first polarized light and reflect the second polarized light;
a half-wave plate configured to receive the first polarized light after the first polarized light passes through the first dichroic mirror and convert the first polarized light into third polarized light, wherein a polarization of the third polarized light is the same as the polarization of the second polarized light;
a phosphor wheel module comprising at least one phosphor wheel, and configured to receive the second polarized light after the second polarized light is reflected by the first dichroic mirror and provide a first stimulated light which passes through the first dichroic mirror; and
a light-guiding rod configured to receive the first stimulated light and the third polarized light, thereby providing an illumination beam; and
a color wheel configured to filter the illumination beam and provide a plurality of color beams.
2. The laser projector of claim 1, wherein the first light-mixing module comprises:

a first laser module comprising one or multiple first laser sources and configured to emit the first polarized light which propagates along a first path;

a second laser module comprising one or multiple second laser sources and configured to emit the second polarized light which propagates along a second path, wherein the second path is perpendicular to the first path; and one or multiple reflectors each having a surface disposed at a predetermined angle with respect to the first path, and disposed in an in-line arrangement with respect to the one or multiple second laser sources and in a staggered arrangement with respect to the one or multiple first laser sources.

3. The laser projector of claim 2, wherein the first laser module further comprises at least one second laser source configured to emit the second polarized light which propagates along the first path and disposed in the staggered arrangement with respect to the one or multiple reflectors.

4. The laser projector of claim 2, wherein the predetermined angle is 45 degrees.

5. The laser projector of claim 2, wherein each of the one or multiple first laser sources is a P-polarized blue laser diode, and each of the one or multiple second laser sources is an S-polarized blue laser diode.

6. The laser projector of claim 1, further comprising:

a second light-mixing module comprising at least one laser source and at least one reflector, and configured to provide a second laser beam which includes a fourth polarized light and a fifth polarized light, wherein a polarization of the fourth polarized light is different from a polarization of the fifth polarized light;

a second dichroic mirror disposed opposite to the first dichroic mirror in the light-splitting module and configured to pass the fourth polarized light and reflect the fifth polarized light; and a reflecting mirror disposed opposite to the second dichroic mirror in the light-splitting module, wherein:

the fourth polarized light is converted into a sixth polarized light after sequentially passing through the second dichroic mirror and the half-wave plate;

a polarization of the sixth polarized light is the same as the polarization of the fifth polarized light;

the sixth polarized light is reflected to the light-guiding rod by the first dichroic mirror;

the phosphor wheel module is further configured to receive the fifth polarized light after the fifth polarized light is reflected by the second dichroic mirror and provide a second stimulated light which passes through the second dichroic mirror and reaches the reflecting mirror; and the third polarized light and the second stimulated light is reflected to the light-guiding rod by the reflecting mirror.

7. The laser projector of claim 6, wherein the phosphor wheel module comprises a phosphor wheel which includes:

a center;

a first part at a first distance from the center for receiving the second polarized light; and a second part at a second distance from the center for receiving the fifth polarized light.

8. The laser projector of claim 6, wherein the phosphor wheel module comprises:

a first phosphor wheel for receiving the second polarized light; and a second phosphor wheel for receiving the fifth polarized light.

9. The laser projector of claim 6, wherein the light-guiding rod comprises:

a first incident surface corresponding to the phosphor wheel module for receiving the first stimulated light and the sixth polarized light;

a relay surface disposed at an angle of 45 degrees with respect to the first incident surface; and a second incident surface corresponding to the relay surface for receiving the second stimulated light and the third polarized light.

10. The laser projector of claim 6, wherein the first polarized light and the fourth polarized light is P-polarized blue light, and the second polarized light, the third polarized light, the fifth polarized light and the sixth polarized light is S-polarized blue light.

* * * * *